US011188096B2

(12) United States Patent
Ogawa et al.

(10) Patent No.: US 11,188,096 B2
(45) Date of Patent: Nov. 30, 2021

(54) CONTROL APPARATUS, CONTROL METHOD, AND STORAGE MEDIUM

(71) Applicant: NEC Corporation, Tokyo (JP)

(72) Inventors: Masatsugu Ogawa, Tokyo (JP); Masafumi Yano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 80 days.

(21) Appl. No.: 15/565,688

(22) PCT Filed: Apr. 14, 2016

(86) PCT No.: PCT/JP2016/002020
§ 371 (c)(1),
(2) Date: Oct. 11, 2017

(87) PCT Pub. No.: WO2016/166983
PCT Pub. Date: Oct. 20, 2016

(65) Prior Publication Data
US 2018/0074516 A1  Mar. 15, 2018

(30) Foreign Application Priority Data
Apr. 16, 2015  (JP) .............................. JP2015-083960

(51) Int. Cl.
G05D 1/02 (2020.01)
G06Q 10/00 (2012.01)
(Continued)

(52) U.S. Cl.
CPC ......... *G05D 1/0291* (2013.01); *G05B 13/042* (2013.01); *G05D 1/0027* (2013.01); *G05D 1/0094* (2013.01); *G06Q 10/00* (2013.01)

(58) Field of Classification Search
CPC .. G05B 13/042; G05D 1/0027; G05D 1/0094; G05D 1/0206
(Continued)

(56) References Cited

U.S. PATENT DOCUMENTS

2004/0010337 A1   1/2004  Mountz
2006/0015215 A1*  1/2006  Howard ............... G05D 1/0088
                                                        700/245
2006/0293793 A1  12/2006  Tamura

FOREIGN PATENT DOCUMENTS

JP   H05-189035   *  7/1993
JP   H05-189035 A    7/1993
(Continued)

OTHER PUBLICATIONS

International Search Report for PCT Application No. PCT/JP2016/002020, dated May 17, 2016.
(Continued)

*Primary Examiner* — Maceeh Anwari

(57) ABSTRACT

Provided is a control apparatus includes, a state information obtainment unit configured for, with respect to each of at least some nodes including an assigned node among a plurality of nodes being mobile nodes, obtaining state information that represents a state related to a predetermined value corresponding to a position of each of the some nodes; a control information generation unit configured for generating control information for controlling movement of the assigned node based on the state information of each of the some nodes; and a control unit configured for controlling movement of the assigned node based on the control information.

11 Claims, 10 Drawing Sheets

(51) Int. Cl.
    *G05B 13/04*     (2006.01)
    *G05D 1/00*      (2006.01)
(58) Field of Classification Search
    USPC .............................................. 701/3
    See application file for complete search history.

(56) References Cited

FOREIGN PATENT DOCUMENTS

| JP | H07-93028 A   |   | 4/1995  |
|----|---------------|---|---------|
| JP | H0793028 A    | * | 4/1995  |
| JP | 2006-344075 A |   | 12/2006 |
| JP | 2006344075    | * | 12/2006 |
| JP | 2009-199359 A |   | 9/2009  |
| JP | 2009199359 A  | * | 9/2009  |
| JP | 4617293 B2    |   | 1/2011  |
| JP | 4926958 B2    |   | 5/2012  |

OTHER PUBLICATIONS

English translation of Written opinion for PCT Application No. PCT/JP2016/002020.
Japanese Office Action for JP Application No. 2017-512203 dated Feb. 4, 2020 with English Translation.

* cited by examiner

CONTROL APPARATUS, CONTROL METHOD, AND STORAGE MEDIUM

This application is a National Stage Entry of PCT/JP2016/002020 filed on Apr. 14, 2016, which claims priority from Japanese Patent Application 2015-083960 filed on Apr. 16, 2015, the contents of all of which are incorporated herein by reference, in their entirety.

TECHNICAL FIELD

The present invention relates to a technology for controlling the arrangement of a plurality of moving nodes.

BACKGROUND ART

Recent years, a lot of applications using an unmanned vehicle have been proposed. The applications include, for example, a disk-shaped robot that automatically performs cleaning of rooms and home delivery using a flying unmanned vehicle (referred to as a drone). A robot working in a hazardous environment, such as a nuclear power plant, is also an example of such applications. While a single unmanned vehicle is used generally in the above applications, applications using a plurality of unmanned vehicles have also been proposed.

For example, PTL 1 discloses an art of quickly collecting products that customers have ordered by use of a plurality of load hauling robots in a factory dealing with E-commerce. PTL 2 discloses an art of performing weeding work using a plurality of weeding robots in a cultivated field where a plurality of groups of weeds have grown. PTL 3 discloses an art of searching for a search target by use of a plurality of unmanned vehicles.

Applications in which a search target is searched for using a plurality of unmanned vehicles, such as the above, have been investigated recent years as defense-related technologies. In general, an unmanned vehicle is referred to as "UxV" (Unmanned x Vehicle) where a word representing an operation space thereof is denoted by "x". For example, an unmanned airplane, an unmanned ship, and an unmanned underwater vessel are referred to as a UAV (Unmanned "Air" Vehicle), a USV (Unmanned "Surface" Vehicle), and a UUV (Unmanned "Undersea" Vehicle), respectively.

Unmanned vehicles as described above include a type of unmanned vehicle that a person operates from a remote place and another type of unmanned vehicle that autonomously behaves under the control of a program installed therein. Technologies have been developed aimed at achieving an unmanned vehicle that can behave as autonomously as possible under the control of a program installed therein. In other words, an unmanned vehicle or an unmanned vehicle group that takes over various actions and labor in place of a person without presence of a person is desired.

CITATION LIST

Patent Literature

[PTL 1] Japanese Patent No. 4617293
[PTL 2] Japanese Unexamined Patent Application Publication No. 2009-199359
[PTL 3] Japanese Patent No. 4926958

SUMMARY OF INVENTION

Technical Problem

Although use of unmanned vehicles have been widely studied as described above, it is difficult to maximize a certain value over the whole of a plurality of unmanned vehicles by a cooperative operation among the unmanned vehicles. The certain values include, for example, the level of efficiency in battery consumption over the whole of unmanned vehicles, the level of search probability of successfully detecting a search target, and the like. Maximization of the values is equivalent to solving an optimization problem defined over the whole of unmanned vehicles.

As a method that maximizes such values, a central management system is conceivable that obtains information uploaded from all the unmanned vehicles, solves an optimization problem using the obtained information, and, based on a result of the optimization, transmits an instruction to each unmanned vehicle. However, obtaining information from all the unmanned vehicles synchronously (at a time interval) is often difficult. For example, an unmanned vehicle is sometimes unable to communicate with the central management system. When, for example, a large quantity of unmanned vehicles are present, obtaining all the information of the respective unmanned vehicles sometimes requires a huge amount of time.

Another method is also conceivable in which, instead of using a central management system as described above, each unmanned vehicle communicates with only other unmanned vehicles present in a neighboring area thereof and operates in a distributed manner. However, maximizing a certain value over the whole of unmanned vehicles in a distributed operation environment is difficult, and no effective method has been proposed.

For example, the related art disclosed in PTL 1 is aimed at reducing an operation cost of an operator. However, the related art does not take into consideration improving an overall value (for example, the level of efficiency in product collection) by a plurality of load hauling robots.

The related art disclosed in PTL 2, with respect to each of a plurality of weeding robots, determines a group of weeds on which the weeding robot is to perform weeding work next so as to improve the operation efficiency of each weeding robot. However, the related art does not take into consideration improving overall operation efficiency over all the weeding robots.

In the related art disclosed in PTL 3, respective robots, using an identical algorithm, update dynamic particle clusters representing presence probability of an object to model mutual behavior thereof. The above configuration enables to reduce data communication among the robots. However, the related art does not take into consideration improving overall search probability over a plurality of robots sufficiently.

As described above, although the related arts seem to make a plurality of unmanned vehicles perform a cooperative operation, improving a certain value over all the unmanned vehicles is not taken into consideration sufficiently. There is a large gap between a group of unmanned vehicles moving toward an objective and the group of unmanned vehicles moving while maximizing a value of the whole group.

The problem as described above is not limited to a cooperative operation among unmanned vehicles. For example, there is an example in which a plurality of persons separately behave in a distributed manner toward an identical objective, such as a plurality of guards and police officers searching for a suspicious person. No technology has been proposed yet of, without centrally managing the position information of all the persons and the like, instructing who is to behave in what way in order to increase an overall value in such an example.

As described thus far, in the related arts, it is difficult to, while, without centrally managing information relating to a plurality of nodes (unmanned vehicles, persons, and the like), further increasing a value over the whole of the nodes by means of a cooperative operation among the plurality of nodes, accomplish an objective defined for the nodes.

The present invention was made to solve the above-described problem. That is, an object of the present invention is to provide a technology of, without centrally managing information relating to each of a plurality of nodes performing a cooperative operation, controlling an operation of each of the plurality of nodes so as to increase a desired overall value.

Solution to Problem

To achieve above described object, a control apparatus according to the present invention is configured to include a state information obtainment means for, with respect to each of at least some nodes including an assigned node among a plurality of nodes being mobile nodes, obtaining state information that represents a state related to a predetermined value corresponding to a position of each of the some nodes; a control information generation means for generating control information for controlling movement of the assigned node based on the state information of each of the some nodes; and a control means for controlling movement of the assigned node based on the control information.

A device according to the present invention is mounted with the above-described control apparatus as an apparatus controlling the device's own movement.

An information processing system according to the present invention includes the above-described control apparatus and is configured to change a spatial arrangement of the plurality of nodes in response to a variation in the state of each of the plurality of nodes, by use of the above-described control apparatus.

A control method, by a computer apparatus, according to the present invention includes: with respect to each of at least some nodes including an assigned node among a plurality of nodes being mobile nodes, obtaining state information that represents a state related to a predetermined value corresponding to a position of each of the some nodes, generating control information for controlling movement of the assigned node based on the state information of each of the some nodes, and controlling movement of the assigned node based on the control information.

In addition, a control method according to the present invention includes: causing a computer apparatus to execute, with respect to each of at least some nodes including an assigned node among a plurality of nodes being mobile nodes, obtaining state information that represents a state related to a predetermined value corresponding to a position of each of the some nodes, generating control information for controlling movement of the assigned node based on the state information of each of the some nodes, and controlling movement of the assigned node based on the control information, the computer apparatus being configured to control each of the plurality of nodes as the assigned node, and thereby changing a spatial arrangement of the plurality of nodes in response to a variation in the state of each of the plurality of nodes.

A storage medium according to the present invention stores a control program causing a computer apparatus to execute: a state information obtainment step of, with respect to each of at least some nodes including an assigned node among a plurality of nodes being mobile nodes, obtaining state information that represents a state related to a predetermined value corresponding to a position of each of the some nodes, a control information generation step of generating control information for controlling movement of the assigned node based on the state information of each of the some nodes, and a control step of controlling movement of the assigned node based on the control information.

Advantageous Effects of Invention

The present invention is able to realize a technology of, without centrally managing information relating to each of a plurality of nodes performing a cooperative operation, controlling an operation of each of the plurality of nodes so as to further increase a desired overall value.

DESCRIPTION OF EMBODIMENTS

Hereinafter, example embodiments of the present invention will be described in detail with reference to the drawings.

First Example Embodiment

Figure 1:
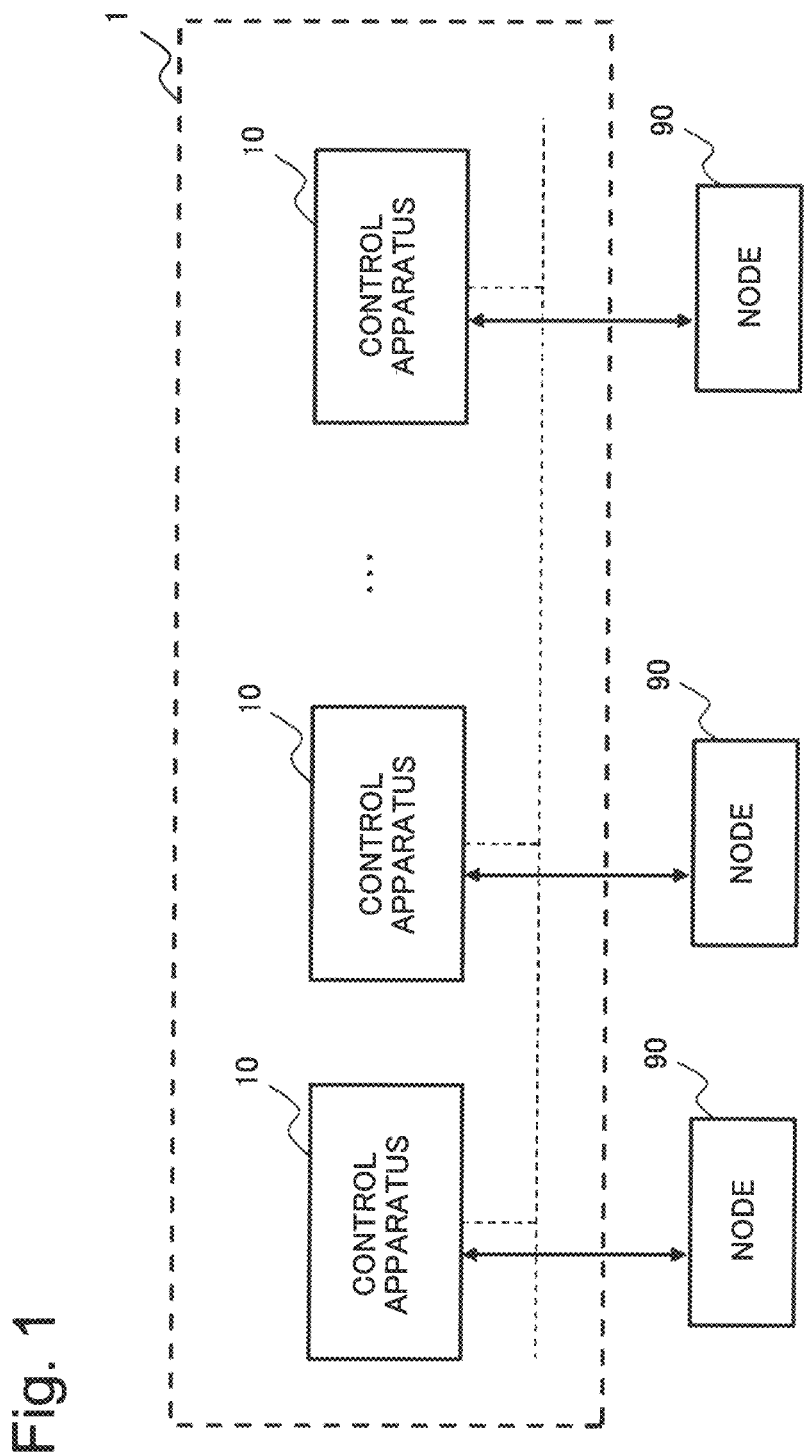
FIG. 1 is a block diagram illustrating a configuration of an information processing system as a first example embodiment of the present invention.

A configuration of an information processing system 1 as a first example embodiment of the present invention is illustrated in FIG. 1. In FIG. 1, the information processing system 1 includes a plurality of control apparatuses 10 each of which controls one of a plurality of nodes 90. The nodes 90 may be, for example, unmanned vehicles or persons, but not limited thereto. Various mobile objects are applicable as the nodes 90. Each control apparatus 10 controls the movement of a node 90 to which the control apparatus 10 is assigned. Hereinafter, a node 90 to which each control apparatus 10 is assigned is also referred to as an assigned node 90.

Each control apparatus 10 is connected to other control apparatuses 10 in a communicable manner. However, each control apparatus 10 does not always have to be communicable with all the other control apparatuses 10. Each control apparatus 10 also does not always have to be communicable with other control apparatuses 10 at all times.

The information processing system 1 makes the plurality of nodes 90 perform cooperative operation to achieve a predetermined objective. Examples of the predetermined objective include, for example, a search for a target, formation of a suitable formation, and the like, but are not limited thereto. For the information processing system 1, a predetermined value has been defined in advance. The predetermined value is set as target to be improved in performing the cooperative operation using the plurality of nodes 90. Examples of the predetermined value include, for example, the amount of battery consumption over all the nodes 90, the level of search probability over all the nodes 90, and the like, but are not limited thereto.

Figure 2:
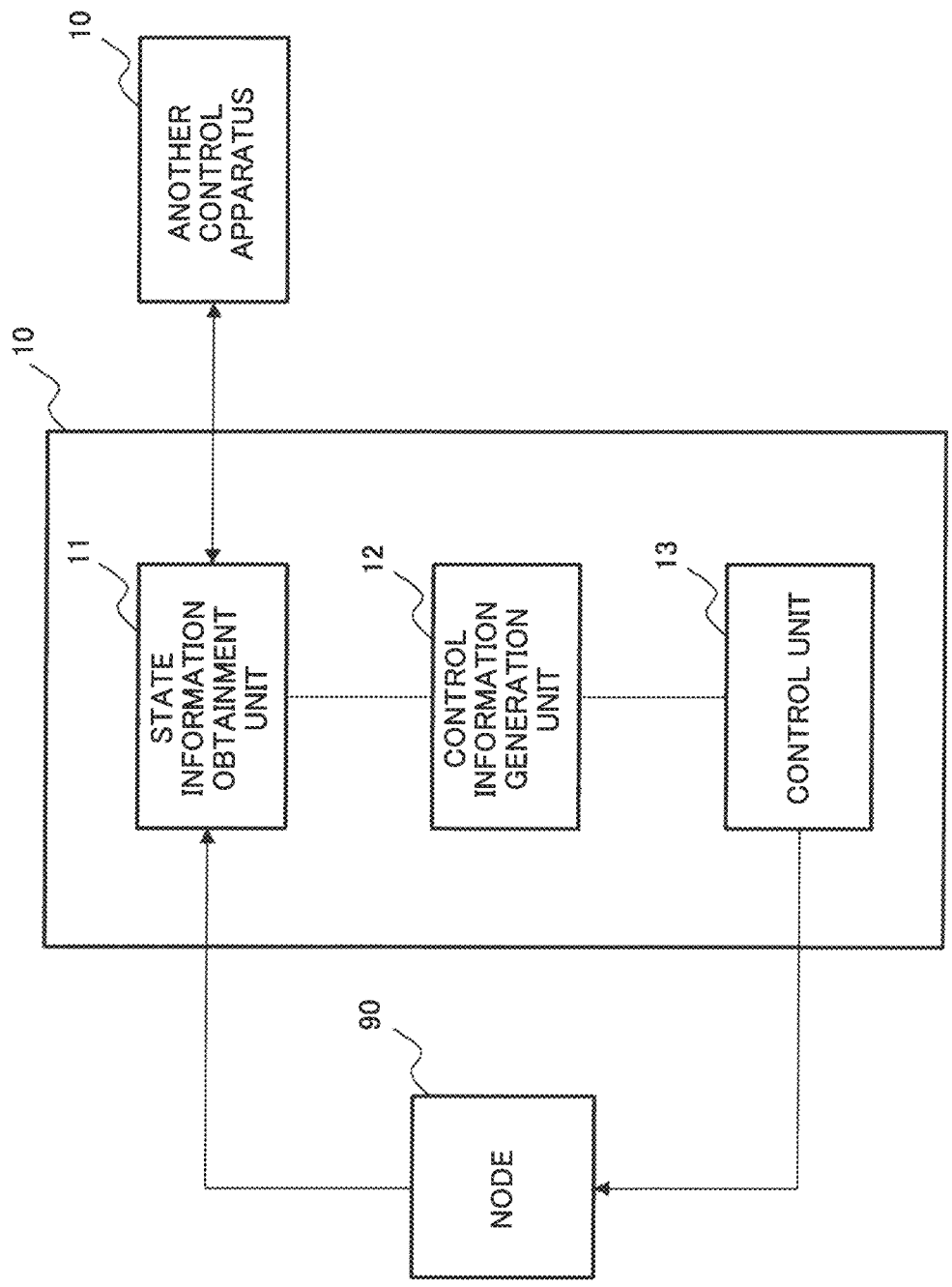
FIG. 2 is a functional block diagram of a control apparatus as the first example embodiment of the present invention.

Next, a functional block configuration of each control apparatus 10 is illustrated in FIG. 2. In FIG. 2, the control apparatus 10 includes a state information obtainment unit 11, a control information generation unit 12, and a control unit 13. In FIG. 2, the direction of each arrow linking rectangles indicating constituent elements indicates an example, and the direction of each signal between constituent elements is not limited to a specific direction.

Figure 3:
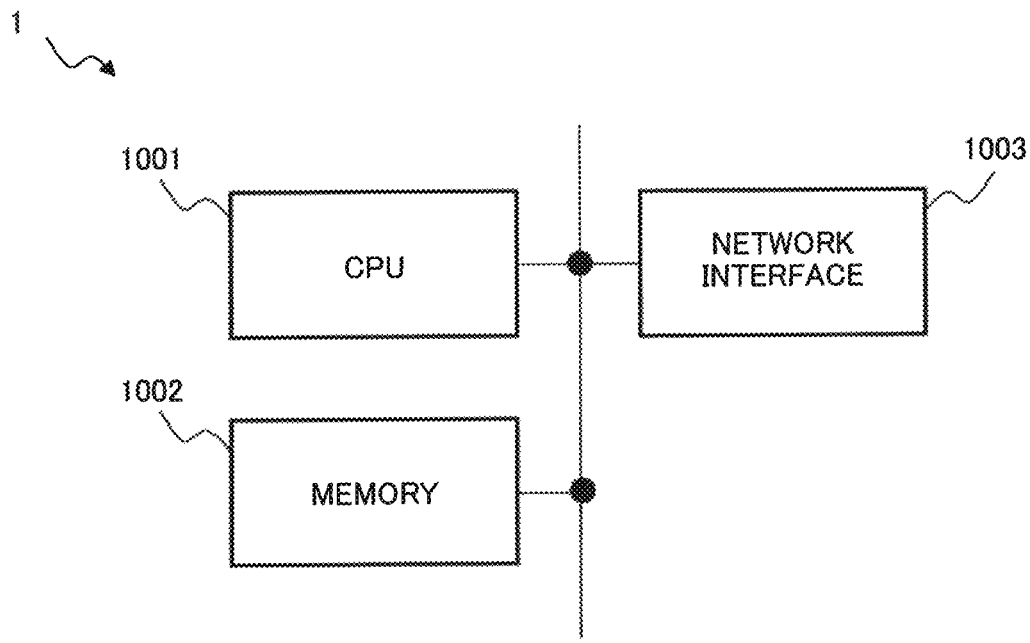
FIG. 3 is a diagram illustrating an example of a hardware configuration of the control apparatus as the first example embodiment of the present invention.

In the above, each control apparatus 10 may be configured with hardware components as illustrated in FIG. 3. In FIG. 3, the control apparatus 10 is configured with a computer apparatus that includes a CPU (Central Processing Unit) 1001, a memory 1002, and a network interface 1003. The memory 1002 is configured with a RAM (Random Access Memory), a ROM (Read Only Memory), an auxiliary storage device (hard disk and the like), and the like. The network interface 1003 is an interface that connects to a network configured with the Internet, a LAN (Local Area Network), a public network, a radio communication network, a combination thereof, or the like. In this case, each functional block in the control apparatus 10 is configured with the CPU 1001 that reads in and executes a computer program stored in the memory 1002 and, in conjunction therewith, controls the respective units.

Each of the plurality of control apparatuses 10 included in the information processing system 1 may be configured with a separate computer apparatus, and some of the plurality of control apparatuses 10 may be configured with an identical computer apparatus. Alternatively, all the control apparatuses 10 may be configured with an identical computer apparatus. Each control apparatus 10 may be implemented at a place distant from the assigned node 90 of the control apparatus 10 or implemented on the assigned node 90. The hardware configuration of each control apparatus 10 and each functional block therein is not limited to the above-described configuration.

Next, details of the respective functional blocks will be described.

The state information obtainment unit 11 obtains state information with respect to each of at least some of the plurality of nodes 90 including the assigned node 90. In the above, the state information represents a state related to the predetermined value corresponding to a position of each node 90. For example, the state information may include information representing a present position itself of the node 90. The state information may include information related to the predetermined value when the node 90 has moved from the present position to any position. There is, for example, a case where the level of capability relating to a function which the node 90 is equipped with and is related to the predetermined value varies in accordance with the position of the node 90. In such a case, the state information may include information based on the level of the capability relating to the function of the node 90 at a present position.

In addition, for example, the state information obtainment unit 11 may obtain position information relating to the assigned node 90 and, based on the obtained position information, calculate state information of the assigned node 90. If the assigned node 90 is configured with a communicable apparatus, the state information obtainment unit 11 may obtain position information of the assigned node 90 by communicating with the assigned node 90 and calculate state information. If the assigned node 90 is configured with an mobile object which is unable to communicate on communication line, such as, in a case of a human and the like, the state information obtainment unit 11 may obtain position information of the assigned node 90 by communicating with a communication terminal carried by the assigned node 90, an apparatus monitoring the assigned node 90, and the like, and calculate state information. When a control apparatus 90 is achieved on the assigned node 90 thereof, the state information obtainment unit 11 may obtain the position information of the apparatus itself and calculate state information. The state information obtainment unit 11 may receive, from a control apparatus 10 that is assigned to each of other nodes 90, state information with respect to the assigned node 90 of the control apparatus 10.

In the above, each control apparatus 10 assigned to one of the plurality of nodes 90 does not always have to obtain state information of the assigned node 90 in synchronization with the other control apparatuses 10. Therefore, the state information obtainment unit 11 may obtain state information from a control apparatus 10, among the other control apparatuses 10 that has obtained the state information of the assigned node 90 during a predetermined period of time including a present point of time. When the information processing system 1 is configured with a plurality of computer apparatuses, a control apparatus 10 in a computer apparatus is not always communicable with another control apparatus 10 in another computer apparatus due to network conditions and other factors. In this case, the state information obtainment unit 11 may obtain, from a control apparatus 10 that is communicable at a present point of time, state information of the assigned node 90. As described above, the state information obtainment unit 11 does not always have to obtain state information with respect to all the nodes 90. The state information obtainment unit 11 may obtain state information with respect to at least some of the nodes 90 including the assigned node 90.

The control information generation unit 12 generates control information for controlling the movement of the assigned node 90 based on the state information of each of at least some of the nodes 90. Specifically, the control information generation unit 12 generates control information of the assigned node 90 using an algorithm that increases the predetermined value (improves the value) over at least some of the nodes 90 the state information of which has been obtained. For example, the control information generation unit 12 may, as the control information, generate information representing a movement direction and a movement control amount. The movement control amount may be, for example, a movement distance. Alternatively, the movement control amount may be an energy amount that is used for moving the assigned node 90. When a constraint on the movement of each node 90 is determined, the control information generation unit 12 may also generate control information in consideration of the constraint.

The control unit 13 controls the movement of the assigned node 90 based on the control information. For example, it is assumed that the control information represents a movement direction and a movement control amount. In this case, by providing information (instruction information) instructing the assigned node 90 of the movement direction and the movement control amount, the control unit 13 controls the assigned node 90 to move in the movement direction included in the instruction information by the movement control amount included in the instruction information. For example, when the assigned node 90 is an unmanned vehicle, the control unit 13 may transmit the instruction information according to the control information to a movement mechanism installed in the unmanned vehicle. When the assigned node 90 is a person, the control unit 13 may display the instruction information according to the control information on a display device of a mobile information terminal possessed by the person.

Figure 4:
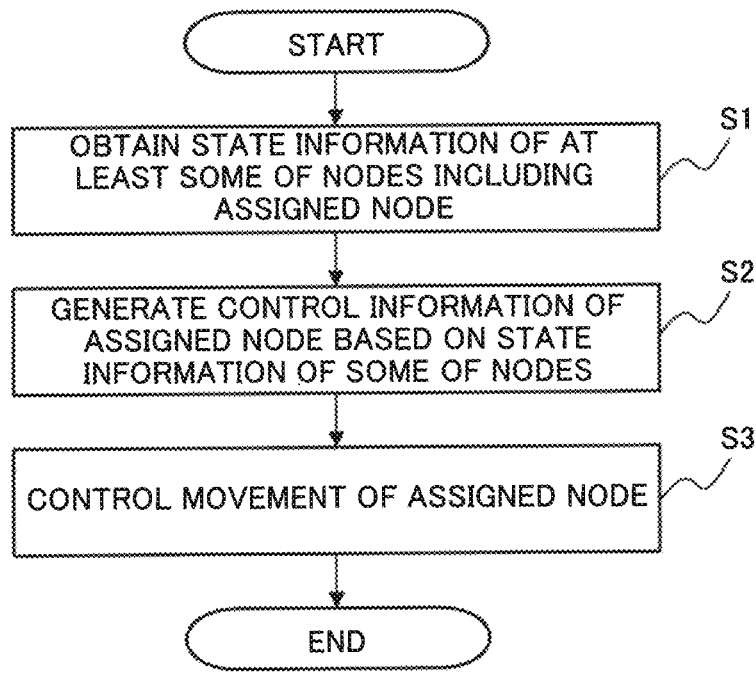
FIG. 4 is a flowchart describing an operation of the control apparatus as the first example embodiment of the present invention.

An operation of the control apparatus 10 in the information processing system 1 configured as described above will be described with reference to FIG. 4.

First, with respect to each of at least some of the nodes 90 including the assigned node 90, the state information obtainment unit 11 obtains state information related to the predetermined value according to the position of the node 90 (step S1).

As described afore, the state information obtainment unit 11 may calculate the state information based on position information obtained with respect to the assigned node 90. In addition, the state information obtainment unit 11 may obtain, from (an)other communicable control apparatus(es) 10, state information of the assigned node(s) 90 of the control apparatus(es) 10.

Next, based on the state information obtained in step S1, the control information generation unit 12 generates control information for controlling the movement of the assigned node 90 (step S2).

As described afore, the control information generation unit 12 may generate the control information of the assigned node 90 using an algorithm that increases the predetermined value within a range of at least some of the nodes 90 of which state information has been obtained. In addition, the control information generation unit 12 may generate information representing a movement direction and a movement control amount.

Next, based on the control information determined in step S2, the control unit 13 controls the movement of the assigned node 90 (step S3).

As described afore, when the assigned node 90 is an unmanned vehicle, the control unit 13 may transmit instruction information based on the control information to a movement mechanism installed in the unmanned vehicle. When the assigned node 90 is a person, the control unit 13 may display instruction information based on the control information, on a display device of a mobile information terminal possessed by the person.

The control apparatus 10 repeats the operation described above. The control apparatus 10, however, does not always have to perform the operation in steps S1 to S3 in this order. For example, each of the state information obtainment unit 11, the control information generation unit 12, and the control unit 13 may operate asynchronously, at its own predetermined timing. In this case, the control information generation unit 12 may operate using state information that has been obtained most recently by the state information obtainment unit 11. In addition, the control unit 13 may operate using control information that has been generated most recently by the control information generation unit 12.

Each control apparatus 10 operating in this way enables the information processing system 1 to adjust the spatial arrangement of the plurality of nodes 90 according to changes in the state related to the predetermined value corresponding to the positions of the respective ones of the plurality of nodes 90.

Next, an effect of the first example embodiment of the present invention will be described.

The information processing system as the first example embodiment of the present invention may, without centrally managing information relating to each of a plurality of nodes performing a cooperative operation, control the movement of each of the plurality of nodes so as to further increase a desired overall value.

The reason for the effect is described as below. That is, in the present example embodiment, with respect to each of at least some of the plurality of mobile nodes including the assigned node, the state information obtainment unit in each control apparatus assigned to each of nodes obtains state information which represents a state related to a predetermined value corresponding to a position of the node. In addition, the control information generation unit generates control information for controlling the movement of the assigned node based on the state information of the at least some of the nodes. In addition, the control unit controls the movement of the assigned node based on the control information.

In the present example embodiment, the above configuration enables each control apparatus to control the movement of the assigned node using state information of at least some of the nodes including the assigned node, which makes it unnecessary to centrally manage the states of all the nodes. In addition, since the movement of an assigned node is controlled by each control apparatus based on the state information of some of the nodes so as to improve the predetermined value over the nodes, therefore control apparatus enables to increase the predetermined overall value achieved based on the spatial arrangement of the plurality of nodes.

Second Example Embodiment

Next, a second example embodiment of the present invention will be described in detail with reference to the drawings. In the respective drawings referred to in the description of the present example embodiment, the same components as those of and steps in which operations are performed in the same manner as in the first example embodiment of the present invention are provided with the same reference symbols and detailed descriptions thereof in the present example embodiment will be omitted.

In the present example embodiment, an example in which an information processing system of the present invention is applied to a use for searching for a target to be searched for by means of a cooperative operation among a plurality of nodes will be described. It is assumed also that the target moves. In addition, in the present example embodiment, as a predetermined value to be improved as a goal in a search for a target performed by a plurality of nodes, the level of search probability of successfully detecting the target is used.

As used herein, presence probability density of a target is expressed by the equation (1) below.

$$g(x,y,z,x_t,y_t,z_t) \quad (1)$$

In the equation (1), x, y, and z represents coordinates (position). In addition, $x_t$, $y_t$, and $z_t$ represents the x-coordinate, y-coordinate, and z-coordinate (position) of the target, respectively.

For example, the equation (1) may be defined in such a way as to form a convex shape having a peak value at the position ($x_t$, $y_t$, $z_t$) of a target and the presence probability density is lowered according to the distance away from the peak. In addition a position where the target has been detected most recently may be applied to the position ($x_t$, $y_t$, $z_t$) of a target in the equation (1). Alternatively a predicted position of a target at a present point of time, which is calculated based on a position where the target has been detected most recently, may be applied to the position ($x_t$, $y_t$, $z_t$) of the target.

Detection probability at which each node detects a search target is expressed by the equation (2) below.

$$p_i(\varphi_i) \quad (2)$$

In the equation (2), $\varphi_i$ denotes search effort supplied to an node i (i-th node) among the plurality of nodes (i is a positive integer). The search effort may be regarded as a movement control amount. The "detection" means recognizing a target by means of a recognition function (for example, eyes, a sonar, and the like) included in a node. The detection probability represents probability (level of capability) of recognizing a target present in a peripheral region centering around the node by the node itself. The detection probability often varies depending on an environment in which each node is present.

For example, it is known that, when a node is an unmanned vehicle that is to detect a search object using sonar under the sea, the detection probability is expressed by the equation (3) below.

$$p_i = 1 - e^{-y_i \varphi_i} \quad (3)$$

In the equation (3), $y_i$ represents quantity that depends on radio wave propagation. For example, when the node is the afore-mentioned unmanned vehicle operating under the sea, $y_i$ is quantity the value of which varies depending on areas of sea where the node is present, and a coefficient appropriate for the environment is determined for the quantity. As described above, without being limited to a case where a node searches for a target in an area of sea, the detection probability at which a node detects a target varies depending on environments in which the node is present.

Search probability at which a target is detected at each node can be represented by a product between the presence probability density of the search target and the detection probability at the node, as expressed by the equation (4) below.

$$f_i = g(z_i, y_i, z_i, x_t, y_t, z_t) \cdot p(\varphi_i) \quad (4)$$

In the equation (4), $x_i$, $y_i$, and $z_i$ denote the x-coordinate, y-coordinate, and z-coordinate (position) of the node i, respectively.

Therefore, search probability over all the plurality of nodes is expressed by the equation (5) below.

$$\sum_i g(x_i, y_i, z_i, x_t, y_t, z_t) \cdot p(\varphi_i) \quad (5)$$

Taking energy consumed by the nodes into account, it should be considered that the search effort is finite. Therefore, the overall search probability is required to be maximized with respect to a predetermined search effort that is to be input to the whole. In other words, the search probability needs to be increased as much as possible with respect to a finite search effort. The present example embodiment is configured to set an upper bound $\Psi$ as a constraint for a search effort per unit time input to the whole and to maximize the search probability under the constraint.

Expressed mathematically, it is required to solve an optimization problem of maximizing the equation (5) under a constraint condition for search efforts expressed by the equation (6) below.

$$\Psi = \sum_i \varphi_i \quad (6)$$

If state information of all the nodes may be obtained synchronously, the above-described optimization problem may be solved easily. However, in a real environment, collecting the state information of the respective nodes synchronously is often difficult. In a real environment, setting up a system centrally managing a plurality of nodes is also often difficult.

An information processing system of the present example embodiment, while making a plurality of nodes search for a target, further improves the search probability in such cases where the state information of the respective nodes cannot be collected synchronously or a system centrally managing a plurality of nodes cannot be set up. Hereinafter, details of the information processing system of the present example embodiment will be described.

Figure 5:
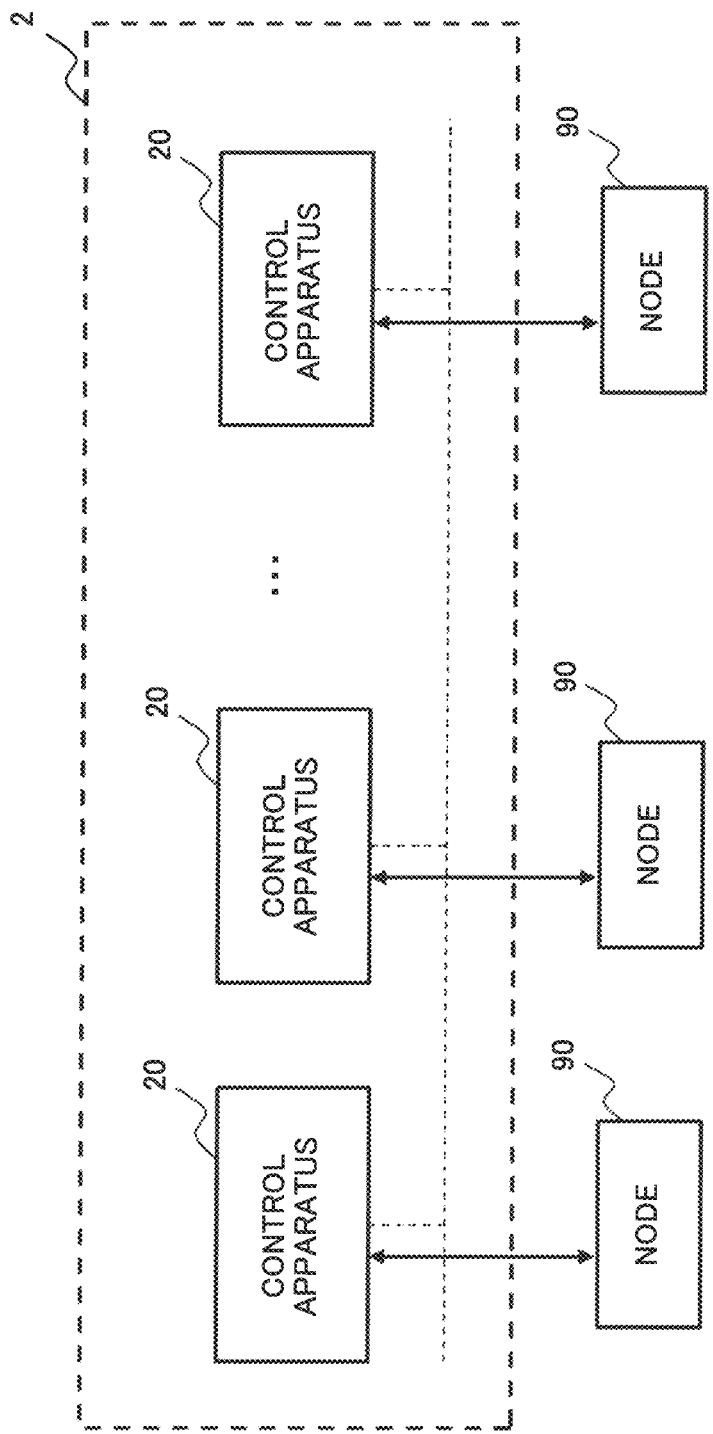
FIG. 5 is a block diagram illustrating a configuration of an information processing system as a second example embodiment of the present invention.

First, a configuration of an information processing system 2 as the second example embodiment of the present invention is illustrated in FIG. 5. In FIG. 5, the information processing system 2 includes a plurality of control apparatuses 20 each of which controls one of a plurality of nodes 90.

Figure 6:
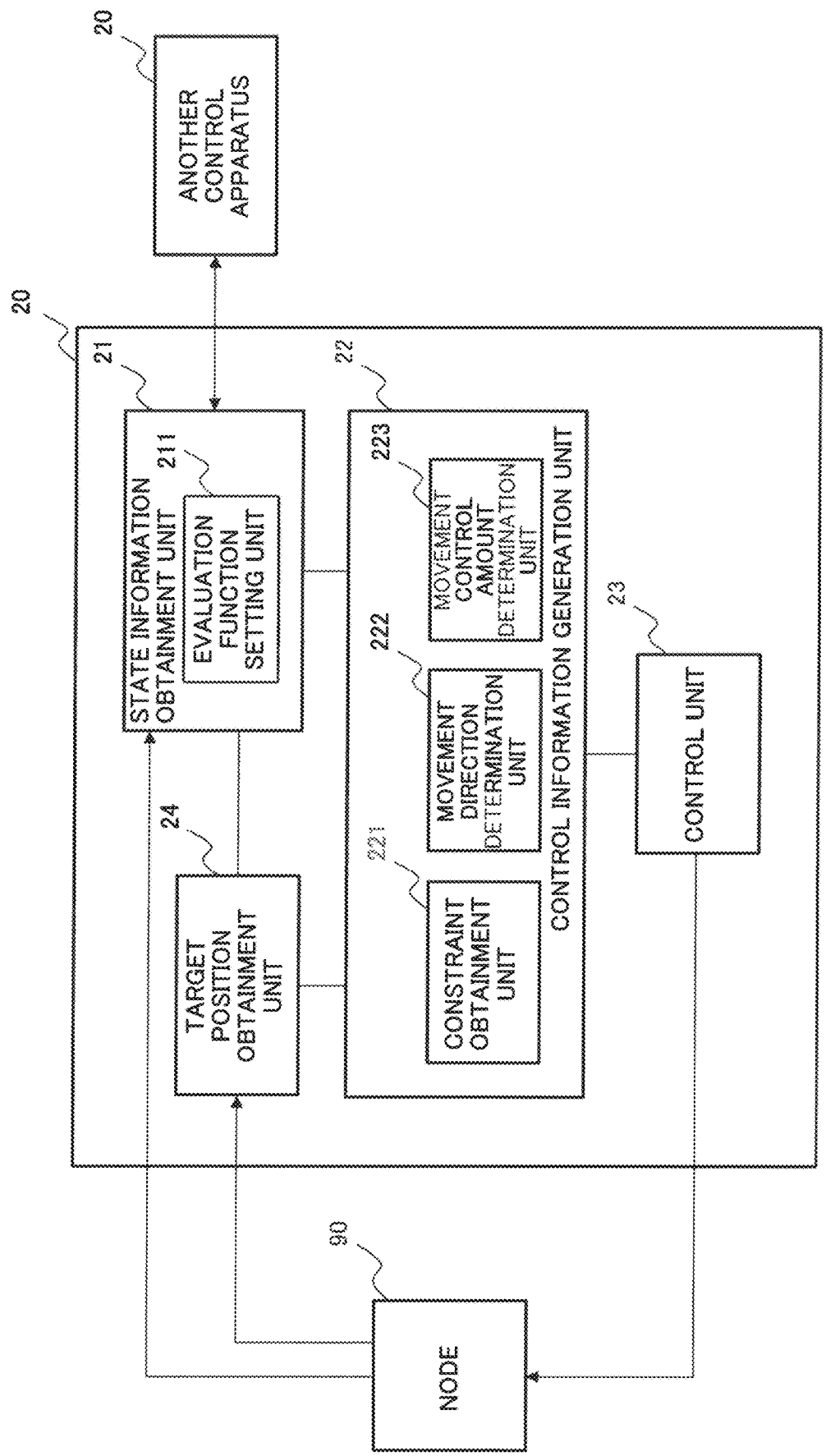
FIG. 6 is a functional block diagram of a control apparatus as the second example embodiment of the present invention.

Next, a functional block configuration of each control apparatus 20 is illustrated in FIG. 6. In FIG. 6, the control apparatus 20 includes a state information obtainment unit 21, a control information generation unit 22, a control unit 23, and a target position obtainment unit 24. The state information obtainment unit 21 includes an evaluation function setting unit 211. The control information generation unit 22 includes a constraint obtainment unit 221, a movement direction determination unit 222, and a movement control amount determination unit 223.

In FIG. 6, the direction of each arrow linking blocks indicating constituent elements indicates an example, and the direction of each signal between constituent elements is not limited to a specific direction.

The control apparatus 20 and the respective functional blocks therein are configurable with the same hardware components as those of the first example embodiment of the present invention, which was described with reference to FIG. 3. However, hardware configurations of the control apparatus 20 and the respective functional blocks therein are not limited to the above-described configuration.

The target position obtainment unit 24 obtains position information relating to a target. The target is, as described afore, an object that is searched for by the plurality of nodes 90. When the target is detected by an assigned node 90 of an apparatus including the target position obtainment unit 24, the target position obtainment unit 24 obtains position information of the target from the assigned node 90 of the apparatus. If the node 90 is a communicable apparatus, the target position obtainment unit 24 may receive position information of the target transmitted by the node 90. If the node 90 is a mobile object which is unable to communicate on communication line, such as a human, the target position obtainment unit 24 may receive position information of the target transmitted by a mobile information terminal and the like possessed by the node 90. When the apparatus including the target position obtainment unit 24 is achieved on the assigned node 90 of the apparatus, the target position obtainment unit 24 may obtain position information of the target by means of a target position identification function included in the assigned node 90, direct input, or the like.

When obtaining position information of the target from the assigned node 90 in this way, the target position obtainment unit 24 transmits the position information of the target to other control apparatuses 20. When being unable to obtain position information of the target from the assigned node 90, the target position obtainment unit 24 may receive position information of the target from another control apparatus 20. The target position obtainment unit 24 may, using position information of the target that has been received most recently from the assigned node 90 or another control apparatus 20, predict a position of the target at a present point of time to obtain position information of the target. For the prediction processing of a position of the target, any known art may be employed by considering characteristics of the target, an environment, and the like.

The state information obtainment unit 21, with respect to each of at least some of the nodes 90 including the assigned node 90, obtains state information of the node 90 using an evaluation function that is set by the evaluation function setting unit 211.

The evaluation function setting unit 211 sets an evaluation function relating to the assigned node 90. The evaluation function is a function for evaluating a degree of contribution of a node 90 at any position for an overall improvement in a predetermined value that is achieved by a spatial arrangement of the plurality of nodes 90. Specifically, as the evaluation function, a function can be used that represents search probability at any position of a node 90 based on the level of detection capability (detection probability) according to an environment at the position of the node 90 and presence probability density of a target. It is assumed that detection probability corresponding to an environment at a position of a node 90 has been determined in advance. For example, the evaluation function setting unit 211 may use the search probability expressed by the equation (4) as the evaluation function. Such an evaluation function is determined in response to an update of the position of an applicable node 90 or the position of a target. Therefore, the evaluation function setting unit 211 updates the evaluation function in response to an obtainment of state information of the assigned node 90 or an obtainment of position information of a target.

In this way, the state information obtainment unit 21, with respect to the assigned node 90, obtains, as the state information, information based on an evaluation function that is set by the evaluation function setting unit 211. The state information obtainment unit 21, with respect to each of other nodes 90, further obtains, as the state information of the node 90, information based on an evaluation function that is set for the node 90 by the state information obtainment unit 21 in a control apparatus 20 assigned to the node 90. In other words, the state information obtainment unit 21 may transmit and receive, with other state information obtainment unit 21 in other communicable control apparatuses 20, information based on evaluation functions that are set by the evaluation function setting units 211.

The state information obtainment unit 21, as similar to the state information obtainment unit 11 in the first example embodiment of the present invention, does not always have to obtain state information with respect to all the nodes 90. The state information obtainment unit 21 may obtain state information with respect to at least some of the nodes 90 including the assigned node 90.

The control information generation unit 22 generates control information (a movement direction and a movement control amount) relating to the assigned node 90 based on the state information of each of the at least some of the nodes 90 and the position information of a target. In detail, the control information generation unit 22 generates the control information relating to the assigned node 90 using the constraint obtainment unit 221, the movement direction determination unit 222, and the movement control amount determination unit 223.

The constraint obtainment unit 221 obtains information representing a constraint on the movement of the plurality of nodes 90. Constraints relating to movement include, for example, a constraint on arrangement of the plurality of nodes 90 and a constraint on movement control amount.

As a constraint on arrangement, the constraint obtainment unit 221 may obtain, for example, information representing a constraint that the distances among the respective nodes 90 are not shorter than a threshold value. The constraint obtainment unit 221 may also obtain information representing a constraint that status of overlap among searchable ranges of the respective nodes 90 satisfies a predetermined condition. The searchable range is a predetermined peripheral region centering around the position of a node 90. The predetermined condition may be a condition that the searchable range of a node 90 does not overlap the searchable range of another node 90. The predetermined condition may also be a condition that the size of an area within the searchable range of a node 90 that overlaps the searchable range of another node 90 is not larger than a threshold value. Such a constraint on arrangement is set in order to prevent decrease of a range that can be searched as a whole, caused by the plurality of nodes 90 clustering together.

As a constraint on movement control amount, the constraint obtainment unit 221 may obtain, for example, information representing a constraint that prescribes an upper bound for the total of movement control amounts that can be input to all the nodes 90 per unit time.

The movement direction determination unit 222 determines a movement direction of the assigned node 90 in consideration of the position information of the assigned node 90, the position information of the target, and a constraint on arrangement if prescribed.

For example, the movement direction determination unit 222 creates a vector that, with the position of the assigned node 90 set as an initial point, extends to the position of the target so that the vector indicates a movement direction of the assigned node 90. The movement direction determination unit 222 adjusts the direction of the vector in consideration of a constraint on arrangement if such a constraint has been obtained. Hereinafter, a vector indicating a movement direction is also referred to as a movement vector.

The movement control amount determination unit 223 determines a movement control amount of the assigned node 90 in consideration of the state information of each of the at least some of the nodes 90 including the assigned node 90, the position information of the target, a constraint on movement control amount if such a constraint is prescribed. Examples of the movement control amount include movement distance of a node 90 and energy amount to be input for moving a node 90 (for example, an amount of torque output from a motor and the like), but are not limited thereto.

For example, the movement control amount determination unit 223 may determine the movement control amount of the assigned node 90 using an algorithm that, when unit search efforts are supplied to the whole of the some of the nodes 90 including the assigned node 90, is able to increase search probability over the whole of the nodes 90. The some of the nodes 90 may be all nodes 90 the state information of which has been obtained or nodes 90, out of such nodes 90, that satisfy a predetermined condition. The predetermined condition may be, for example, a condition that the distance from the assigned node 90 is not longer than a threshold value (in a neighboring area).

For example, the movement control amount determination unit 223 compares information that is obtained using an evaluation function with respect to the assigned node 90 with information that is obtained using evaluation functions with respect to other nodes 90. Based on a result from the comparison, the movement control amount determination unit 223 may determine the movement control amount so as to further increase the total of search probabilities when unit search efforts are supplied to the some of the nodes 90 including the assigned node 90.

Specifically, the movement control amount determination unit 223, with respect to the assigned node 90, calculates an increase in the search probability from a present point of time when a unit search effort is input in the direction determined by the movement direction determination unit 222, using an evaluation function that is set at the present point of time. The movement control amount determination unit 223, with respect to each of other nodes 90 the state information of which has been obtained, also obtains an increase in the search probability from the present point of time when a unit search effort is input in the direction determined with respect to the node 90. In this case, it is assumed that, as to the increase in the search probability with respect to each of other nodes 90, an increase in the search probability per unit search effort calculated by the movement control amount determination unit 223 in a control apparatus 20 assigned to the node 90 has been obtained by the state information obtainment unit 21 as state information. If the increase in the search probability with respect to the assigned node 90 is greater than the increases in the search probability with respect to other nodes 90, the movement control amount determination unit 223 may determine the unit search effort as a movement control amount of the assigned node 90 in the next control step. If the increase in the search probability with respect to the assigned node 90 is less than the increases in the search probability with respect to other nodes 90, the movement control amount determination unit 223 may determine zero as a movement control amount of the assigned node 90 in the next control step. In other words, in this case, the movement control amount determination unit 223 may determine not to supply any search effort to the assigned node 90, and not to move the assigned node 90 in the next control step. A case where a plurality of nodes 90 other than the assigned node 90 are included in the at least some of the nodes 90 including the assigned node 90 will now be described. In this case, the movement control amount determination unit 223 may compare an increase in the search probability between the assigned node 90 and each of other nodes 90 as described afore and integrate results from the comparisons to determine the movement control amount of the assigned node 90.

In the above, the search probability per unit search effort is equivalent to the derivative of an evaluation function. Therefore, when, as described above, an operation of determining a movement control amount is repeated so as to increase the search probability per unit search effort at each of the some of the nodes 90 including the assigned node 90, the derivatives of evaluation functions of the respective nodes 90 become identical to one another. Thus, the movement control amount determination unit 223 may determine a movement control amount so that the derivatives of evaluation functions set to the respective ones of the at least some of the nodes 90 including the assigned node 90 becomes identical to one another.

The movement control amount determination unit 223 may, as described above, determine the movement control amount of the assigned node 90 so that information (derivative) obtained from an evaluation function that is set with respect to the assigned node 90 becomes substantially identical to information (derivatives) obtained from evaluation functions that are set with respect to other nodes 90.

When a constraint on movement control amount is further prescribed, the movement control amount determination unit 223 takes the constraint into consideration in determining a movement control amount. For example, a case where an upper bound is prescribed for the total of movement control amounts is assumed. In this case, if movement control amounts being determined can be obtained from all the control apparatuses 20 each assigned to one of the plurality of nodes 90, the movement control amount determination unit 223 adjusts the movement control amount so that the total of the movement control amounts does not exceed the upper bound. When there is a control apparatus 20 from which a movement control amount cannot be obtained, the movement control amount determination unit 223 calculates an estimated value of movement control amount that is determined with respect to a node 90 to which the control apparatus 20 is assigned. Estimation methods include a method of using an assumed value determined in advance or any other known estimation technology.

The control information generation unit 22 generates control information for moving the assigned node 90 in the movement direction determined by the movement direction determination unit 222 by the movement control amount determined by the movement control amount determination unit 223.

The control unit 23 controls the movement of the assigned node 90 in accordance with the control information generated by the control information generation unit 22. Specifically, the control unit 23 outputs instruction information based on the control information generated by the movement control amount determination unit 223 to the assigned node 90 to move the assigned node 90 in the movement direction by the movement control amount.

An operation of each control apparatus 20, configured as described above, in the information processing system 2 will be described with reference to FIG. 7. In the following description, it is assumed that a constraint on arrangement and a constraint on movement control amount have been already obtained by the constraint obtainment unit 221.

Figure 7:
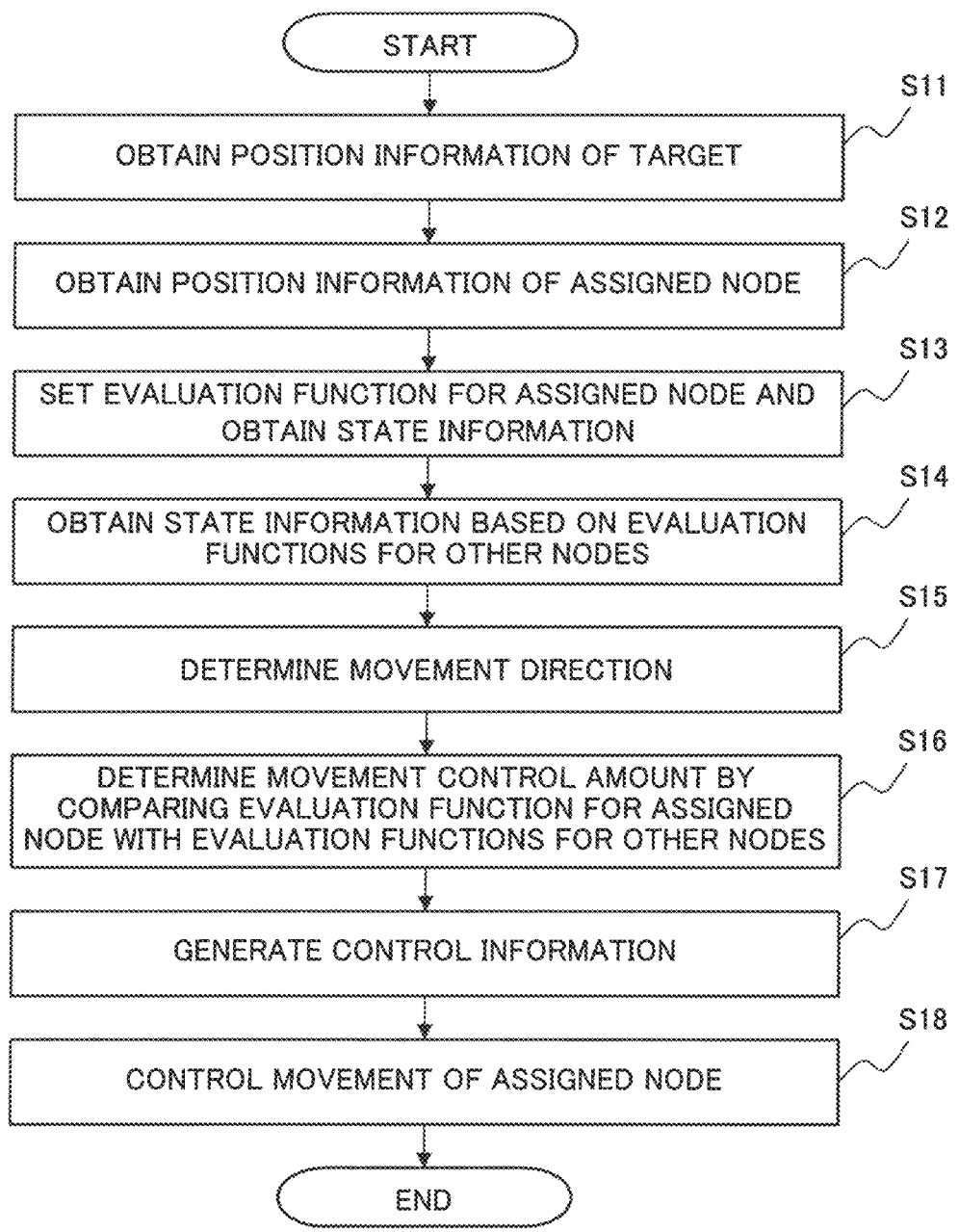
FIG. 7 is a flowchart describing an operation of the control apparatus as the second example embodiment of the present invention.

In FIG. 7, first, the target position obtainment unit 24 obtains position information of a target (step S11).

As described afore, the target position obtainment unit 24 may obtain position information of the target detected by the assigned node 90 or obtain position information of the target detected by another node 90 from another control apparatus 20 assigned to the another node 90. As described afore, the target position obtainment unit 24 may also predict a present position of the target based on position information of the target that has been obtained in the past.

Next, the state information obtainment unit 21 obtains position information of the assigned node 90 (step S12).

Next, the state information obtainment unit 21, using the evaluation function setting unit 211, sets an evaluation function that reflects the position of the target and the position of the assigned node 90. The state information obtainment unit 21 calculates information based on the set evaluation function as state information of the assigned node 90 (step S13).

Next, the state information obtainment unit 21, as state information of each of at least some of the other nodes 90, obtains information based on an evaluation function that is set with respect to the node 90 from a control apparatus 20 controlling the node 90 (step S14).

Next, the control information generation unit 22, using the movement direction determination unit 222, determines a movement direction of the assigned node 90 in consideration of the constraint on arrangement (step S15).

Specifically, as described afore, the movement direction determination unit 222 may generate a movement vector that, with the position of the assigned node 90 set as an initial point, extends to the position of the target and adjust the direction of the vector in consideration of the constraint on arrangement.

Next, the control information generation unit 22, using the movement control amount determination unit 223, determines a movement control amount to be input to the assigned node 90 (step S16).

Specifically, as described afore, the movement control amount determination unit 223 may determine the movement control amount of the assigned node 90 based on a result from comparison between information obtained from the evaluation function represented by the state information of the assigned node 90 and information obtained from the evaluation functions represented by the state information of other nodes 90.

Next, the control information generation unit 22 generates control information for controlling the assigned node 90 to move in the direction determined in step S14 by the movement control amount determined in step S15 (step S17).

Next, the control unit 23 outputs instruction information based on the control information generated in step S17 to the assigned node 90 to control the movement of the assigned node 90 (step S18).

For example, the control unit 23 may transmit the instruction information based on the control information to a movement mechanism installed in an unmanned vehicle serving as the assigned node 90. The control unit 23 may also, for example, make a mobile information terminal possessed by a person serving as the assigned node 90 display the instruction information based on the control information on a display device thereof.

The control apparatus 20 repeats the operation described above. The control apparatus 20, however, does not always have to perform the operation in steps S11 to S18 in this order. For example, each of the state information obtainment unit 21, the control information generation unit 22, the control unit 23, and the target position obtainment unit 24 may operate asynchronously, at its own predetermined timing. In this case, the control information generation unit 22 may operate using state information based on an evaluation function that has been set most recently by the state information obtainment unit 21 (the evaluation function setting unit 211) and position information of the target that has been obtained most recently by the target position obtainment unit 24. The control unit 23 may also operate using control information that has been generated most recently by the control information generation unit 22.

Each control apparatus 20 operating in this way enables the information processing system 2 to adjust the spatial arrangement of the plurality of nodes 90 in response to changes in the state related to the search probability corresponding to the positions of the respective ones of the plurality of nodes 90.

Next, specific examples of the information processing system 2 will be described.

Specific Example 1

Figure 8:
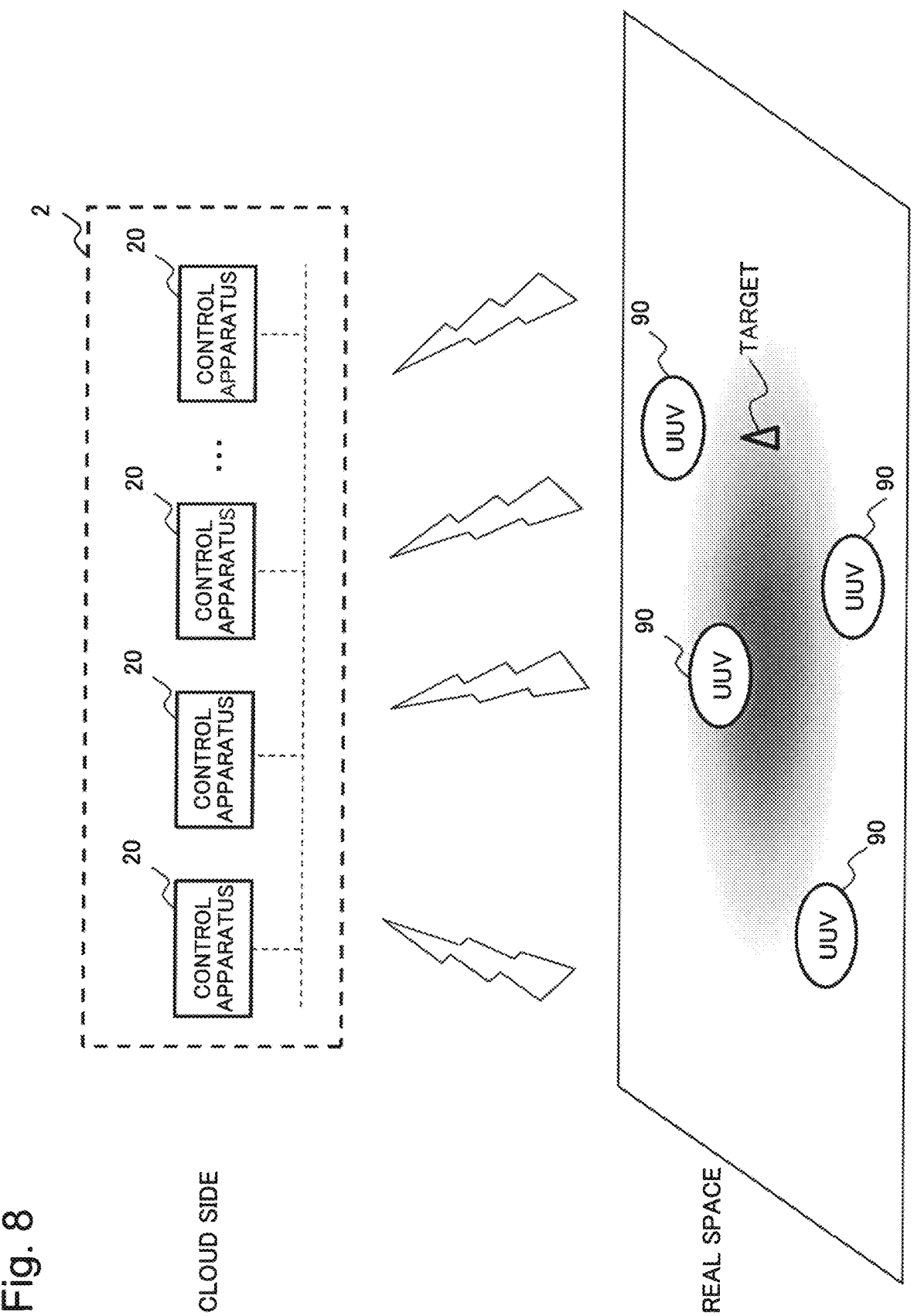
FIG. 8 is a diagram schematically describing a specific example of the second example embodiment of the present invention.

In a specific example 1, the nodes 90 are assumed to be unmanned vehicles, referred to as UUVs (Unmanned Undersea Vehicle). A UUV is an unmanned vehicle that autonomously operates underwater and searches for a target using a sonar. The UUV is movable in response to control information received from the outside. Hereinafter, a UUV as a node 90 is also referred to as a UUV 90. In addition, in the specific example 1, it is assumed that the information processing system 2 is deployed on a cloud in a cloud computing environment, as illustrated in FIG. 8. In other words, each control apparatus 20 remotely controls a UUV 90 to which the control apparatus 20 is assigned from the cloud. The above configuration enables the information processing system 2 to search for a target using a plurality of UUVs 90.

In this case, each control apparatus 20 is configured to control the movement of a UUV 90 to which the control apparatus 20 is assigned while transmitting and receiving state information and the like with control apparatuses 20 assigned to UUVs 90 in a neighboring area as if the UUV 90 exchanged the information with the UUVs 90 in the neighboring area.

The evaluation function setting unit 211 applies the above-described equation (4) as an evaluation function. As the presence probability density g of a target in the equation (4), a Gaussian-type function which is configured to have a peak value at a position $(x_t, y_t, z_t)$ at which the target has been detected most recently, and the presence probability density becomes lower according to distance away from the peak position. In addition, as the detection probability $p_i$ of each UUV 90 in the equation (4), the equation (3) is applied. Depending on areas of sea where a UUV 90 is present, $y_i$ in the equation (3) takes a different value. Therefore, in the specific example 1, a database including $y_i$ for each area of sea is prepared in advance. The state information obtainment unit 21 changes $y_i$ based on the position information of the UUVs 90.

In the specific example 1, each UUV 90 includes an upload function of transmitting various types of information to the control apparatuses 20 and the like. Each UUV 90, when the UUV 90 itself detects a target, obtains position information of the target. The UUV 90 subsequently transmits the position information of the target that the UUV 90 itself has detected to other UUVs 90 and a control apparatus 20 on the cloud that is assigned to the UUV 90 itself. When receiving position information of the target from another UUV 90, each UUV 90 also transmits the position information to a control apparatus 20 on the cloud that is assigned to the UUV 90 itself. The above configuration enables the target position obtainment unit 24 of each control apparatus 20 to obtain the position information of the target.

In addition, each UUV 90 transmits the position information of the UUV 90 itself to a control apparatus 20 on the cloud that is assigned to the UUV 90 itself. The above configuration enables the state information obtainment unit 21 of each control apparatus 20 to obtain the position information of a UUV 90 to which the control apparatus 20 itself is assigned and to set an evaluation function based on the position information of the UUV 90 to which the control apparatus 20 itself is assigned and the position information of the target.

Each UUV 90 performs such a transmission operation of information in an asynchronous manner. In other words, upload of various types of position information to each control apparatus 20 is performed asynchronously. For this reason, even when the respective control apparatuses 20 are communicable with one another in the information processing system 2 deployed on the cloud, information relating to all the UUVs 90 is not collected synchronously. Therefore, a general optimization technology cannot be applied to improving the search probability over all the UUVs 90. Even in an environment in which information relating to the respective UUVs 90 is collected only in an asynchronous manner, mixing old information forcibly may enable to perform optimization calculation using a general optimization technology. However, since such old information has a harmful influence on the whole calculation, appropriate optimization cannot be achieved practically. Therefore, an environment is assumed in which upload of various types of position information to the respective control apparatuses 20 is performed in an asynchronous manner in the specific example.

Figure 9:
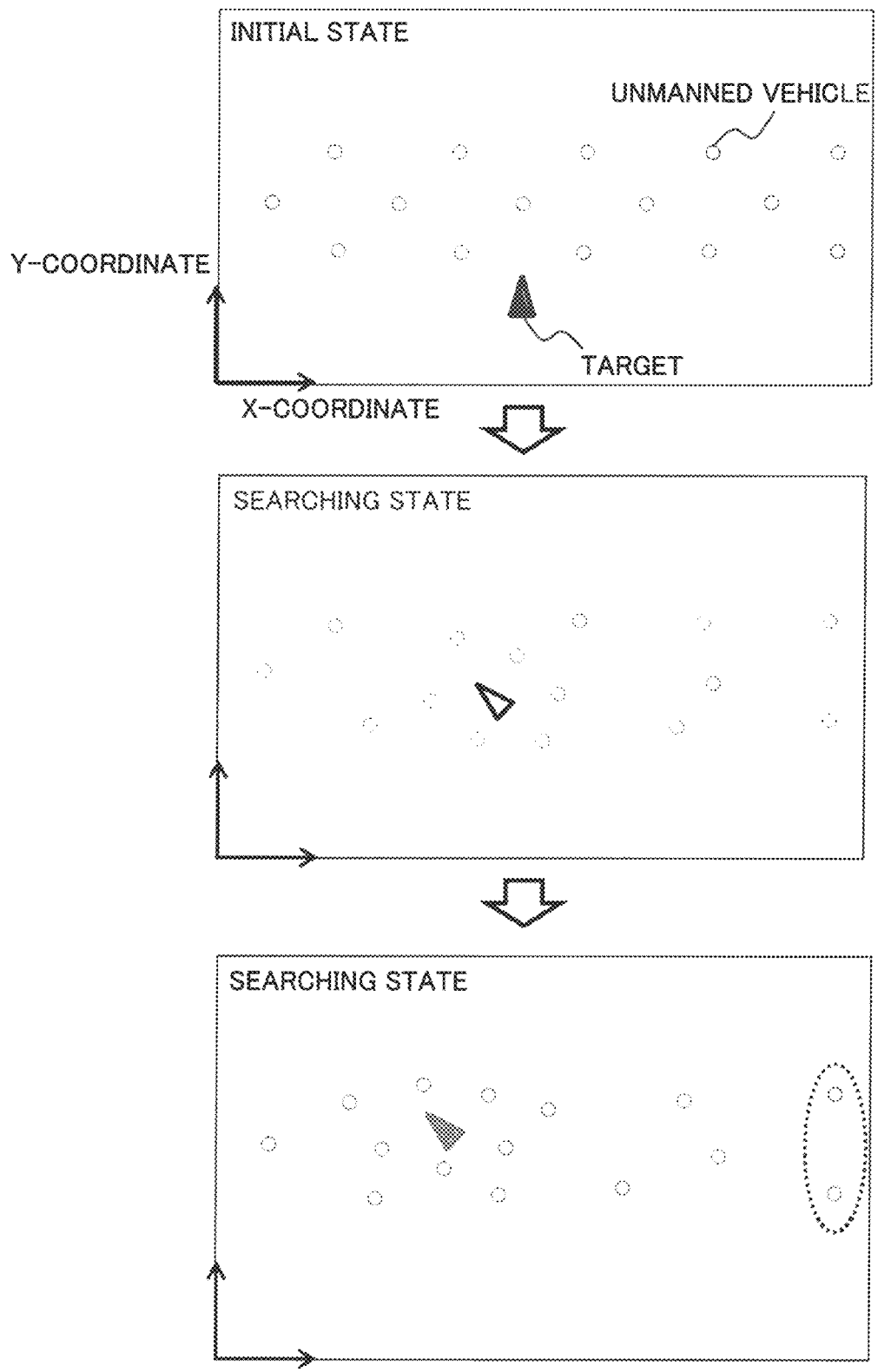
FIG. 9 is a diagram schematically describing a simulation result of the specific example of the second example embodiment of the present invention.

A result from a computer simulation performed with respect to an operation of the respective control apparatuses 20 in the information processing system 2 based on the assumptions in the specific example 1 described thus far will be described with reference to the drawings. FIG. 9 illustrates a way in which the spatial arrangement of a group of UUVs 90, the movements of which are controlled by an operation of the information processing system 2, varies as the time elapses.

First, it was assumed that a formation of the group of UUVs 90 was formed as illustrated in a frame "initial state" in FIG. 9. In a space where such a group of UUVs 90 are present, a target moves. In FIG. 9, triangles indicate the target. In addition, circles indicate the UUVs 90. FIG. 9 indicates that, as it goes from the upper frame to the lower frame, the time elapses. FIG. 9 represents that, in concert with the movement of the target, the group of UUVs 90 come close to the target in such a way as to wrap the target and the target is successfully tracked. FIG. 9 also represents that UUVs 90 (for example, two UUVs 90 encircled by a dotted ellipse at the right end) positioned far from the target do not move and no useless movement is performed.

In the above-described simulation, height of the overall search probability was was evaluated. In the present example embodiment, the evaluation function setting unit 211 and the movement control amount determination unit 223 mainly perform a function of increasing the search probability. Thus, a simulation in which the two functional block elements were disabled from operating was performed as comparison against the simulation of the specific example 1 illustrated in FIG. 9, and the overall search probability per unit search effort was compared between both simulations. In the simulation as the comparison, a fixed value was used as a movement control amount. As the fixed movement control amount, a value that was tuned so that the overall search probability exhibited as high a value as possible was used. As a result, in the simulation as the comparison, all the UUVs 90 are controlled to come close to the target gradually.

Since search probability, in principle, has a property such that the more search effort is input, the higher the probability increases. Therefore, values of the search probability per input search effort (per unit search effort) were compared. As a result of the comparison, the simulation of the specific example 1 of the information processing system 2 resulted in an approximately 30 percent, on average, higher overall search probability (per unit search effort) than that in the simulation of the target for comparison.

As described above, it was revealed that, in the specific example 1 of the information processing system 2, it is possible to perform control that further increases the overall search probability while tracking a target using a group of a plurality of UUVs 90 even in an environment in which information from the respective UUVs 90 cannot be obtained synchronously.

Specific Example 2

Figure 10:
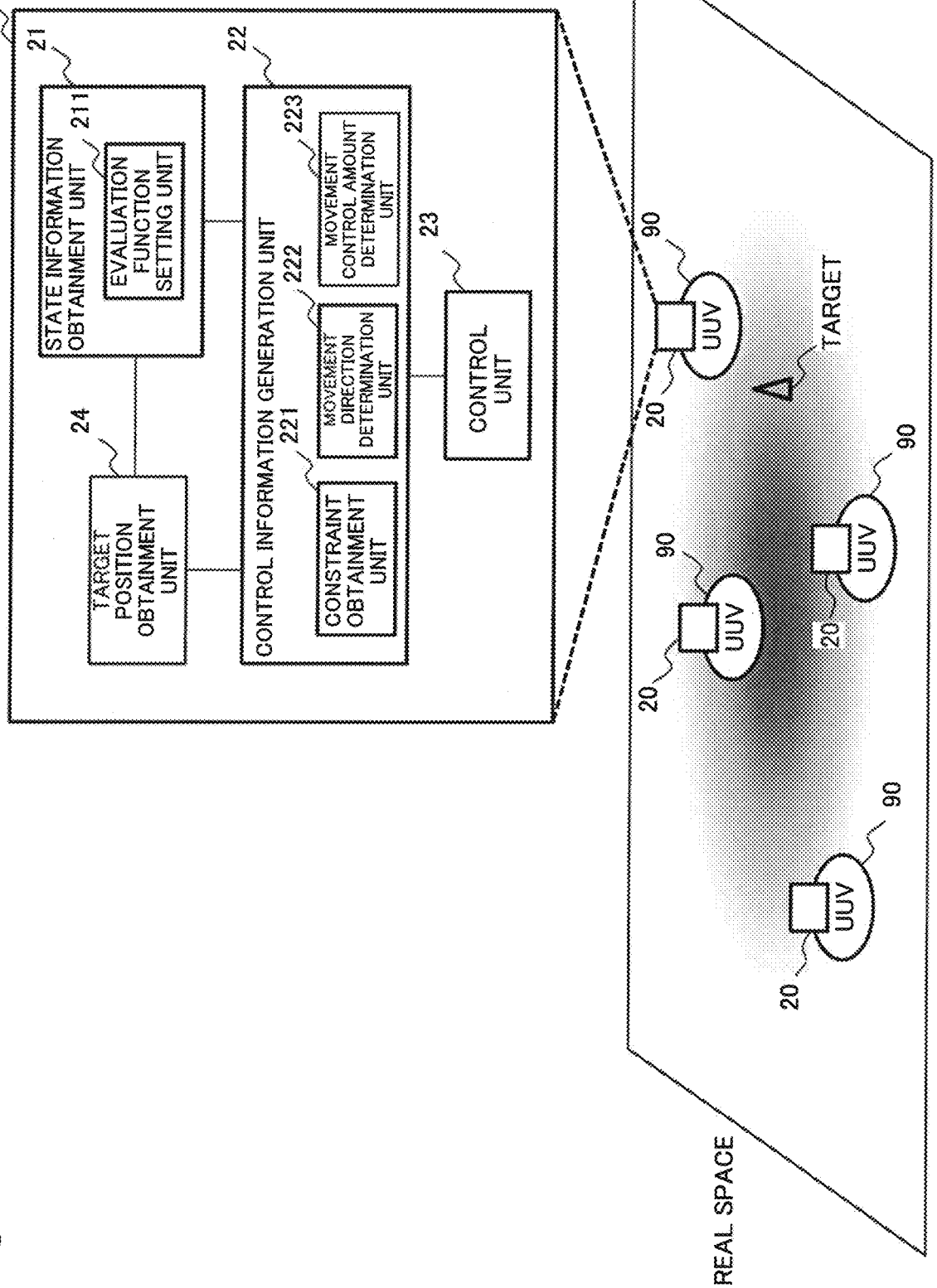
FIG. 10 is a diagram schematically describing another specific example of the second example embodiment of the present invention.

In a specific example 2, as with the specific example 1, UUVs 90 are applied as the nodes 90. However, in the specific example 2, an example in which, as illustrated in FIG. 10, a control apparatus 20 in the present example embodiment is mounted on each of a plurality of UUVs 90 will be described. In other words, in the specific example 2, each UUV 90, using a control apparatus 20 mounted on the UUV 90 itself, transmits and receives information with control apparatuses 20 mounted on other communicable UUVs 90 in a neighboring area and moves in an autonomous and distributed manner under the control of the control apparatus 20. Such a UUV 90 constitutes an example embodiment of a device according to the present invention.

The specific example 2 as described above assumes a case where information transmission from a field where the group of UUVs 90 move to a remote place is difficult, which causes the respective UUVs 90 to be expected to move in an autonomous and distributed manner. Such a case is encountered very often in the actual application phase. As described above, the specific example 2 is effective for a case where, as in the specific example 1, installation of the information processing system 2 at a remote place is difficult. Alternatively, the specific example 2 is also effective for a case where the information processing system 2 at a remote place as in the specific example 1 does not function properly, and the like.

The specific example 2 differs from the specific example 1 in that each UUV 90 needs not include an upload function. In the specific example 2, when a UUV 90 has detected a target, the target position obtainment unit 24 in the control apparatus 20 mounted on the UUV 90 obtains and transmits position information of the target to other UUVs 90. When the UUV 90 has not detected the target, the target position obtainment unit 24 receives position information of the target from another UUV 90 to obtain the position information of the target. When a state in which the UUV 90 has not detected the target and the target position obtainment unit 24 has not obtained latest position information of the target from any other UUVs 90 has lasted for a predetermined period of time, the target position obtainment unit 24 may predict a present position of the target based on past position information to obtain the position information of the target. The state information obtainment unit 21 and the control information generation unit 22 obtain the position information of the UUV 90 on an as-needed basis. In addition to the above, assumptions on an evaluation function, the presence probability density g of the target, the detection probability $p_i$, $y_i$ for each area of sea, and the like are the same as those in the specific example 1.

Based on such assumptions as to the specific example 2, a computer simulation of an operation of the respective control apparatuses 20 in the information processing system 2 was performed. As a result, in the simulation of the specific example 2 of the information processing system 2, a target was able to be tracked appropriately, as with the specific example 1. In addition, the overall search probability per unit search effort was compared between the simulation of the specific example 2 and the simulation as a target for comparison, which was described in the specific example 1. As a result of the comparison, the simulation of the specific example 2 of the information processing system 2 resulted in, as with the specific example 1, an approximately 30 percent, on average, higher overall search probability (per unit search effort) than that in the simulation of the target for comparison.

As described above, it was revealed that, in the specific example 2 of the information processing system 2, it is possible to perform control that further increases the search probability over the whole of the UUVs 90 while tracking a target using a group of a plurality of UUVs 90 even when a control apparatus 20 is mounted on each of the plurality of UUVs 90.

Specific Example 3

Figure 11:
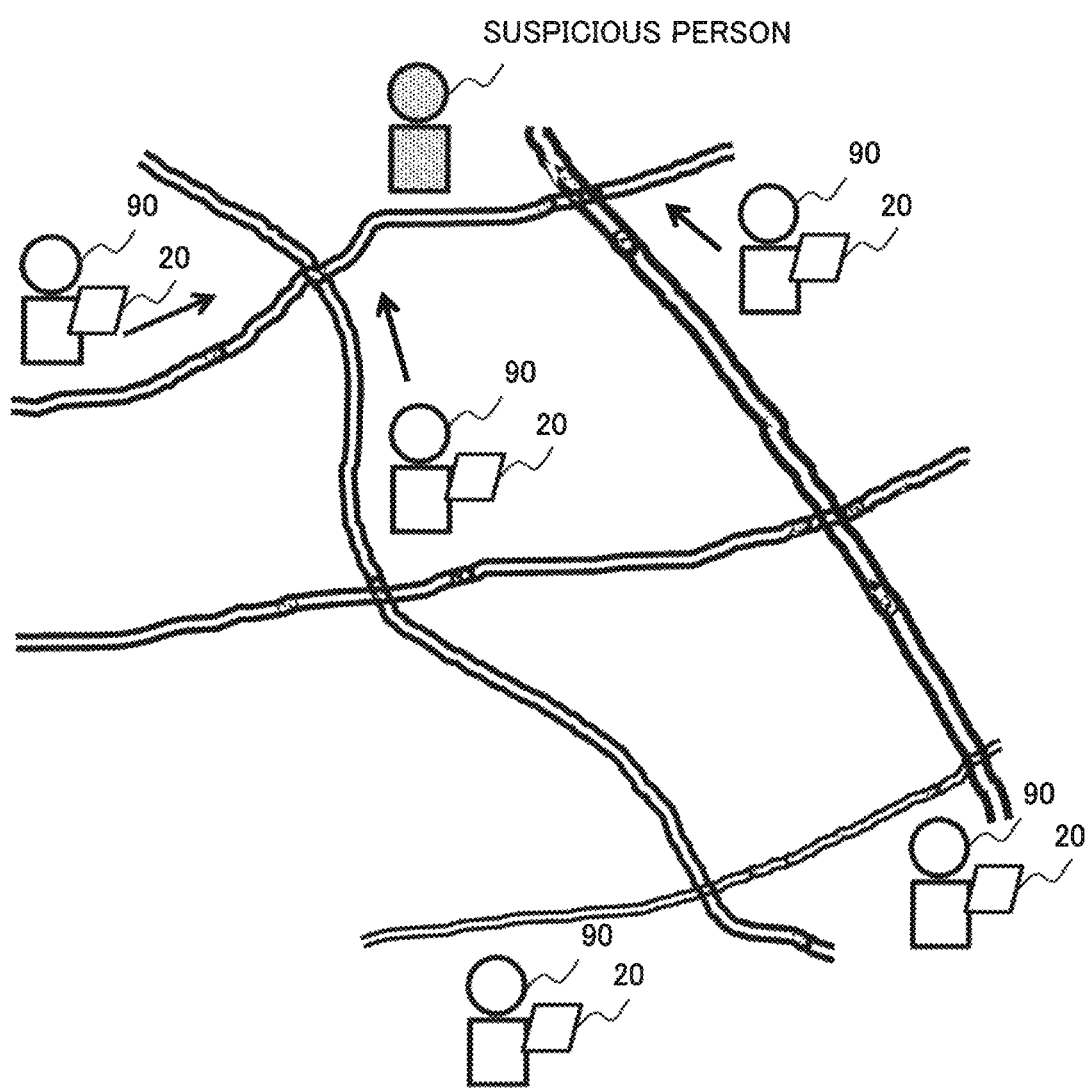
FIG. 11 is a diagram schematically describing still another specific example of the second example embodiment of the present invention.

In a specific example 3, the nodes 90 are assumed to be persons (security guards). In a specific example 3, an application example is assumed in which, for example, a plurality of guards secures a target area and, when a suspicious person is detected, an appropriate number of guards track and capture the suspicious person. Hereinafter, a guard as a node 90 is also referred to as a guard 90. In the specific example 3, it is also assumed that, as illustrated in FIG. 11, each control apparatus 20 is achieved in a tablet terminal carried by a guard 90.

The control unit 23 of each control apparatus 20 displays instruction information based on control information on a display device of the tablet terminal. The control unit 23 may, for example, display, on the display device, information representing the position of a movement destination reached by a movement in a direction determined by the movement direction determination unit 222 by a movement control amount determined by the movement control amount determination unit 223. As a result of the display, the guard 90 moves toward the position of the movement destination displayed on the display device. The above configuration enables each control apparatus 20 to control the movement of a guard 90.

As an example of a portion of the target position obtainment unit 24, each control apparatus 20 may also display, on the display device, a user interface (for example, a button-shaped figure accepting a push-down operation and the like) for notifying detection of a suspicious person. The above configuration enables a guard 90 who has detected a suspicious person to operate the user interface. The target position obtainment unit 24 that has accepted the operation may transmit the position information of the control apparatus 20 at the point of time of the operation as the position information of the suspicious person to control apparatuses 20 in tablet terminals carried by other guards 90.

The specific example 3 may be described in the same manner as the specific example 2 by replacing a target and a UUV in the description of the specific example 2 with a suspicious person and a guard, respectively. Regarding an evaluation function and the presence probability density g of a target, the same assumptions as those in the specific examples 1 and 2 may be made. In addition, regarding the detection probability $p_i$, a function related to a range of view of each guard 90 may be set. In other words, as each $y_i$ corresponding to an environment, a function that is set to a quantity proportional to the range of view may be applied.

In the specific example 3 of the information processing system 2, the above configuration enables the control apparatuses 20 in the tablet terminals carried by the respective ones of a plurality of guards 90 to further increase the search probability over all the guards 90 while tracking a suspicious person. As a result, the specific example 3 of the information processing system 2 enables efficient guarding and tracking and capture of a suspicious person.

In the specific example 3, the nodes 90 are not limited to guards and may also be applied to another type of persons, such as police officers and the running police. In addition, although a suspicious person was assumed as a target, targets are not limited thereto. For example, as a target, a group of people, such as a "crowd", to which a problem is likely to occur may be applied. The above assumption enables the specific example 3 of the information processing system 2 to be applied to efficient guarding of a crowd. Although, in the specific example 3, an example in which each control apparatus 20 was achieved in a tablet terminal was described, devices in which the control apparatus 20 is achieved are not limited thereto. For example, each control apparatus 20 may be achieved in a wearable terminal or a spectacle-type terminal. Each control apparatus 20 may also be achieved in an information terminal installed in a small vehicle or car that guards, police officers, and the like use as a movement means. In addition, the information processing system 2 may be deployed on a cloud as with the specific example 1. In this case, each control apparatus 20 on the cloud may receive various types of information from a terminal that moves with a person as a node 90 to which the control apparatus 20 is assigned and, transmit instruction information based on control information so as to be displayed on a display device of the terminal.

This concludes the description of the specific examples.

Next, an effect of the second example embodiment of the present invention will be described.

The information processing system as the second example embodiment of the present invention may, without being required to centrally manage information relating to all the plurality of nodes searching for a target by way of a cooperative operation, increase overall search probability while tracking the target excellently.

The reason for the effect is described as bellow. That is, in the present example embodiment, the target position obtainment unit obtains position information of a target. The state information obtainment unit, with respect to each of at least some of a plurality of nodes including an assigned node, generates state information of the node using the evaluation function. The evaluation function is configured to evaluate a degree of contribution of the node in any position, for an overall improvement in the predetermined value that is achieved by a spatial arrangement of nodes. The state information obtainment unit updates the evaluation function relating to the assigned node according to an update in the position information of the target and an update in position information of the assigned node, by using the evaluation function setting unit. The control information generation unit determines a direction directed from a present position of the assigned node to the position of the target as a movement direction, in consideration of a constraint on arrangement, by using the movement direction determination unit. The control information generation unit determines a movement control amount of the assigned node based on a result of comparison between information obtained from the evaluation function of the assigned node and information obtained from the evaluation functions of other nodes, in consideration of a constraint on movement control amount, by using the movement control amount determination unit. In addition, the control unit controls the assigned node to move in the determined direction by the determined movement control amount.

In the present example embodiment, a case where the information processing system was deployed on a cloud (specific example 1), a case where, in each device to be controlled, a control apparatus thereof was achieved (specific example 2), and a case where, in a terminal carried by each person, a control apparatus thereof was achieved (specific example 3) were described. In addition to the above, for example, a computer apparatus to which the information processing system is installed may be set up at a seashore, and the information processing system may remotely control the movement of a plurality of UUVs. The information processing system may also be achieved in a computer apparatus mounted on a mother ship that coordinates a plurality of UUVs.

Although, in the present example embodiment, the description was made using a UUV as an example of an unmanned vehicle that was applied as a node, another type of unmanned vehicle may be applied as a node. For example, in the present example embodiment, various types of unmanned vehicles, such as an airplane-type flying unmanned vehicle and a land-based unmanned vehicle, are applicable as nodes.

In the present example embodiment, in a use for searching for and tracking a moving target using a plurality of nodes, the nodes are controlled applying, as a predetermined value, improvement in overall search probability. Without being limited to the above, in the present example embodiment, in a use for, for example, detecting search targets distributed in a fixed manner, the nodes may be controlled applying, as a predetermined value, detection of more search targets with a higher energy efficiency. In addition, in the present example embodiment, in a use for arranging a plurality of unmanned vehicles each of which is mounted with radio equipment in such a way as to allow the unmanned vehicles to transmit and receive information with one another, the unmanned vehicles may be controlled applying, as a predetermined value, realization of a formation allowing the unmanned vehicles to transmit and receive information with one another in a wider range at a desired transfer rate. As described above, the present example embodiment is applicable to a use for, by use of a plurality of nodes, accomplishing a predetermined objective while further increasing a predetermined overall value.

Although, in the present example embodiment, the specific examples in which an unmanned vehicle or a person (guard) was applied as a node were described, another type of mobile object may be applied as a node.

Although, in the present example embodiment, the description was made under the assumption that presence probability density of a target, detection probability of a node, and search probability were expressed by the equations (1) to (4), these may be expressed by other equations. Although, in the present example embodiment, the description was made under the assumption that a constraint condition and a predetermined value were expressed by the equations (5) and (6), these may be expressed by other equations.

In the present example embodiment, the description was made under the assumption that the constraint obtainment unit obtained a constraint on arrangement and a constraint on movement control amount. However, the constraint obtainment unit does not always have to obtain the constraints or may obtain many more other constraints.

In the above-described respective example embodiments of the present invention, the description was made mainly on examples in which the respective functional blocks in a control apparatus were achieved by a CPU executing a computer program stored in a storage device or a ROM. Without being limited to the implementation described above, a portion or all of the respective functional blocks or a combination thereof may be achieved by dedicated hardware.

In the above-described respective example embodiments of the present invention, the functional blocks in a control apparatus may be achieved distributed to a plurality of apparatuses.

In the above-described respective example embodiments of the present invention, it may be configured such that operations of a control apparatus, which were described with reference to the respective flowcharts, are stored in a storage device (storage medium) of a computer apparatus as a computer program according to the present invention, and the CPU in the computer apparatus reads and executes the computer program. In such a case, the present invention is constituted by a code of such a computer program or a storage medium storing such a computer program.

In addition, an example embodiment implemented by any combination of above described example embodiments is also possible to be realized.

A part or the whole of above described example embodiments may be described as follows, but not limited thereto.

(Supplementary Note 1)

A control apparatus including:

a state information obtainment unit for, with respect to each of at least some nodes including an assigned node among a plurality of nodes being mobile nodes, obtaining state information that represents a state related to a predetermined value corresponding to a position of each of the some nodes;

a control information generation unit for generating control information for controlling movement of the assigned node based on the state information of each of the some nodes; and a control unit for controlling movement of the assigned node based on the control information.

(Supplementary Note 2)

The control apparatus according to supplementary note 1, wherein the state information obtainment unit generates state information of each of the some nodes including the assigned node, by using an evaluation function for evaluating a degree of contribution of each node existing at any position for an overall improvement in the predetermined value that is achieved by a spatial arrangement of the plurality of nodes.

(Supplementary Note 3)

The control apparatus according to supplementary note 2, wherein the control information generation unit generates the control information based on a result of comparison between information obtained with respect to the assigned node using the evaluation function and information obtained with respect to another node using the evaluation function.

(Supplementary Note 4)

The control apparatus according to supplementary note 3, wherein the control information generation unit generates the control information so that information obtained from the assigned node by applying the evaluation function becomes substantially identical to information obtained from the another node by applying the evaluation function.

(Supplementary Note 5)

The control apparatus according to any one of supplementary notes 1 to 4 further including a target position obtainment unit for obtaining position information relating to a search target (target) to be searched by the plurality of nodes, wherein the control information generation unit generates control information for the node based on the position information relating to the target in addition to the state information of each of the some nodes.

(Supplementary Note 6)

The control apparatus according to supplementary note 5, wherein the state information obtainment unit uses, as the evaluation function, a function based on information representing presence probability of the target at any position.

(Supplementary Note 7)

The control apparatus according to supplementary note 5 or 6, wherein the state information obtainment unit uses, as the evaluation function, a function based on a level of capability of detecting the target by the node.

(Supplementary Note 8)

The control apparatus according to any one of supplementary notes 1 to 7, wherein the control information generation unit generates, as the control information, information representing a movement direction and movement control amount of the node.

(Supplementary Note 9)

The control apparatus according to any one of supplementary notes 1 to 8, wherein the control information generation unit generates the control information based on a constraint on movement of the plurality of nodes.

(Supplementary Note 10)

The control apparatus according to supplementary note 9, wherein the control information generation unit adjusts a movement control amount of the assigned node by considering, as the constraint on movement, an upper bound for the movement control amount allocated in total to the plurality of nodes.

(Supplementary Note 11)

The control apparatus according to supplementary note 9 or 10, wherein the control information generation unit adjusts a movement direction of the assigned node by considering, as the constraint on movement, a predetermined condition to be satisfied regarding situation of overlapping between a searchable range of the assigned node and a searchable range of the another node.

(Supplementary Note 12)

A device being mounted with a control apparatus according to any one of supplementary notes 1 to 11 as an apparatus controlling movement of the own device.

(Supplementary Note 13)

An information processing system including a control apparatus according to any one of supplementary notes 1 to 11, the information processing system being configured to change a spatial arrangement of the plurality of nodes in response to a variation in the state of each of the plurality of nodes, by use of the control apparatus.

(Supplementary Note 14)

A control method, by a computer apparatus, including:

with respect to each of at least some nodes including an assigned node among a plurality of nodes being mobile nodes, obtaining state information that represents a state related to a predetermined value corresponding to a position of each of the some nodes;

generating control information for controlling movement of the assigned node based on the state information of each of the some nodes; and controlling movement of the assigned node based on the control information.

(Supplementary Note 15)

A control method including:

executing, with respect to each of at least some nodes including an assigned node among a plurality of nodes being mobile nodes, obtaining state information that represents a state related to a predetermined value corresponding to a position of each of the some nodes;

generating control information for controlling movement of the assigned node based on the state information of each of the some nodes; and controlling movement of the assigned node based on the control information, with each of the plurality of nodes as the assigned node; and thereby changing a spatial arrangement of the plurality of nodes in response to a variation in the state of each of the plurality of nodes.

(Supplementary Note 16)

A control program causing a computer apparatus to execute:

a state information obtainment step of, with respect to each of at least some nodes including an assigned node among a plurality of nodes being mobile nodes, obtaining state information that represents a state related to a predetermined value corresponding to a position of each of the some nodes;

a control information generation step of generating control information for controlling movement of the assigned node based on the state information of each of the some nodes; and a control step of controlling movement of the assigned node based on the control information.

The present invention was described above using the above-described example embodiments as typical examples. However, the present invention is not limited to the above example embodiments. Various aspects that could be understood by a person skilled in the art may be applied to the present invention within the scope of the present invention.

This application claims priority based on Japanese Patent Application No. 2015-083960, filed on Apr. 16, 2015, the entire disclosure of which is incorporated herein by reference.

REFERENCE SIGNS LIST

1, 2 Information processing system
10, 20 Control apparatus
11, 21 State information obtainment unit
12, 22 Control information generation unit 13, 23 Control unit
24 Target position obtainment unit
211 Evaluation function setting unit
221 Constraint obtainment unit
222 Movement direction determination unit
223 Movement control amount determination unit
90 Node, UUV, guard
1001 CPU
1002 Memory
1003 Network interface

What is claimed is:

1. A control apparatus of a plurality of control apparatuses respectively controlling a plurality of nodes, the control apparatus comprising:
 a communication interface configured for communication; and
 processing circuitry that is configured to execute:
 state information obtainment processing for obtaining state information that represents a state related to a position of an assigned node being controlled by the control apparatus for the assigned node among the plurality of nodes, and first nodes being controlled by other control apparatuses respectively and being communicable with the control apparatus for the assigned node among the plurality of nodes, via the communication interface, state information obtainment processing including generating state information of each of the assigned node and the first nodes, by using an evaluation function for evaluating a degree of contribution of each of the assigned node and the first nodes existing at any position in such a way as to maximize a search probability;
 target position obtainment processing for obtaining position information relating to a target to be searched by the plurality of nodes;
 control information generation processing for generating control information for controlling movement of the assigned node based on the state information of each of the assigned node and the first nodes in such a way as to maximize, as to a finite search effort, the search probability at which the target is detected over all of the plurality of nodes including the assigned node, the first nodes, and second nodes being controlled by rest of control apparatuses respectively and being not communicable with the control apparatus for the assigned node among the plurality of nodes; and
 control processing for controlling movement of the assigned node based on the control information,
 wherein the control information generation processing includes generating control information for the assigned node and the first nodes based on the position information relating to the target in addition to the state information of each of the assigned node and the first nodes.

2. The control apparatus according to claim 1, wherein the control information generation processing includes generating the control information based on a result of comparison between information obtained with respect to the assigned node using the evaluation function and information obtained with respect to the first nodes using the evaluation function.

3. The control apparatus according to claim 2, wherein the control information generation processing includes generating the control information so that information obtained from the assigned node by applying the evaluation function becomes identical to information obtained from the first nodes by applying the evaluation function.

4. The control apparatus according to claim 1, wherein the state information obtainment processing includes applying, as the evaluation function, a function based on information representing presence probability of the target at any position.

5. The control apparatus according to claim 1, wherein the state information obtainment processing includes applying, as the evaluation function, a function based on a level of capability of detecting the target by the node.

6. The control apparatus according to claim 1, wherein the control information generation processing includes generating, as the control information, information representing a movement direction and movement control amount of the assigned node.

7. The control apparatus according to claim 1, wherein the control information generation processing includes generating the control information based on a constraint on movement of the plurality of nodes.

8. The control apparatus according to claim 7, wherein the control information generation processing includes adjusting a movement control amount of the assigned node by considering, as the constraint on movement, an upper bound for the movement control amount allocated in total to the plurality of nodes.

9. The control apparatus according to claim 7, wherein the control information generation processing includes adjusting a movement direction of the assigned node by considering, as the constraint on movement, a predetermined condition to be satisfied regarding situation of overlapping between a searchable range of the assigned node and searchable ranges of the first nodes.

10. A control method for a control apparatus of a plurality of control apparatuses respectively controlling a plurality of nodes, by a computer apparatus, comprising:
 generating state information that represents a state related to a position of an assigned node and first nodes, the state information including each of the assigned node and the first nodes, by using an evaluation function for evaluating a degree of contribution of each of the assigned node and the first nodes existing at any position in such a way as to maximize a search probability, the assign node being controlled by the control apparatus for the assigned node among the plurality of nodes, and first nodes being controlled by other control apparatuses respectively and being communicable with the control apparatus for assigned node among the plurality of nodes;
 obtaining the state information;
 obtaining position information relating to a target to be searched by the plurality of nodes;
 generating control information for controlling movement of the assigned node based on the state information of each of the assigned node and the first nodes in such a way as to maximize, as to a finite search effort, a search probability at which the target is detected over all of a plurality of nodes including the assigned node, the first nodes, and second nodes being controlled by rest of control apparatuses respectively and being not communicable with the control apparatus for assigned node among the plurality of nodes; and
 controlling movement of the assigned node based on the control information, wherein generating control information includes generating control information for the assigned node and the first nodes based on the position information relating to the target in addition to the state information of each of the assigned node and the first nodes.

11. A computer-readable non-transitory storage medium storing a control program for a control apparatus of a plurality of control apparatuses respectively controlling a plurality of nodes, the program causing a computer apparatus to execute:

a state information obtainment step of, obtaining state information that represents a state related to a position of an assigned node being controlled by the control apparatus for the assigned node among the plurality of nodes and first nodes being controlled by other control apparatus respectively and being communicable with the control apparatus for the assigned node among the plurality of nodes, the state information obtainment step including generating state information of each of the assigned node and the first nodes, by using an evaluation function for evaluating a degree of contribution of each of the assigned node and the first nodes existing at any position in such a way as to maximize a search probability;

a target position obtainment step of obtaining position information relating to a target to be searched by the plurality of nodes;

a control information generation step of generating control information for controlling movement of the assigned node based on the state information of each of the assigned node and the first nodes in such a way as to maximize, as to a finite search effort, a search probability at which the target is detected over all of a plurality of nodes including the assigned node, the first nodes, and second nodes being controlled by other control apparatuses respectively and being not communicable with the control apparatus for the assigned node among the plurality of nodes; and a control step of controlling movement of the assigned node based on the control information, wherein the control information generation step includes generating control information for the assigned node and the first nodes based on the position information relating to the target in addition to the state information of each of the assigned node and the first nodes.

* * * * *